United States Patent [19]

Colthorpe et al.

[11] 4,171,771
[45] Oct. 23, 1979

[54] CENTRAL HEATING SYSTEMS

[75] Inventors: Kenneth J. Colthorpe, Workingham; Roger Hughes, Thames Ditton; Reginald C. Wade, London, all of England

[73] Assignee: Servotomic Limited, London, England

[21] Appl. No.: 846,386

[22] Filed: Oct. 28, 1977

[30] Foreign Application Priority Data

Nov. 2, 1976 [GB] United Kingdom ............... 45457/76
Jan. 13, 1977 [GB] United Kingdom ................. 1242/77

[51] Int. Cl.² ............................................. F24D 3/02
[52] U.S. Cl. ................................. 237/8 R; 236/25 A; 237/63
[58] Field of Search .................. 237/8 R, 63; 236/25, 236/25 A

[56] References Cited

U.S. PATENT DOCUMENTS 2,177,731   10/1939   Long et al. .......................... 236/25

FOREIGN PATENT DOCUMENTS 2272347   12/1975   France ........................................ 237/63

*Primary Examiner*—William E. Wayner
*Attorney, Agent, or Firm*—Merriam, Marshall & Bicknell

[57] ABSTRACT

A central heating system comprising a heat exchanger, heat dissipating means, and a connecting piping circuit for liquid flow, has a pump capable of pumping the liquid around the circuit at a lower or a high flow rate, the flow rate of liquid being sensed to control the means which supplies heat to the heat exchanger so that heat is supplied when the pump means is operating at its higher rate and is not supplied when the pump means is operating at its lower rate. The rate of operation of the pump means is determined by means which senses the temperature of the circulating liquid so that the pump means operates at its lower rate when the temperature of the liquid exceeds a selected value and at its higher rate when the liquid temperature is below a selected value.

7 Claims, 4 Drawing Figures

CENTRAL HEATING SYSTEMS

BACKGROUND TO THE INVENTION

Field of the Invention

This invention relates to central heating systems and to heating assemblies for use in such systems.

SUMMARY OF THE INVENTION

It is an object of the present invention to provide an improved form of central heating system and a heating assembly for use in such a system.

According to one aspect of the present invention we provide a central heating system comprising a heat exchanger; a heat dissipating means for releasing heat to a location to be heated; a piping circuit connecting the heat exchanger and dissipating means so that the liquid can pass from the heat exchanger to the heat dissipating means and return to the heat exchanger; pump means for pumping liquid around said circuit, said pump means being arranged selectively to pump said liquid either at a lower flow rate or at a higher rate; heating means to supply heat to the heat exchanger; control means to control the supply of energy to the heating means; flow rate sensing means arranged to operate the control means to supply energy to the heating means whenever the pump means is operating at said higher rate and to cut-off the supply of energy whenever the pump means is operating at said lower rate; and temperature sensing means arranged to operate the pump means at its lower flow rate whenever the temperature of the circulating liquid is above a preselected value and at its higher flow rate whenever said temperature is below a preselected value.

In the preceding paragraph and in the following description the invention has been described in relation to a central heating system in which the pump means is arranged to pump liquid at two flow rates only. The pump could be arranged to pump the liquid at two or more higher flow rates if so desired.

In a central heating system in accordance with the present invention, when the system first starts up from cold the pump means will operate at its higher flow rate so that the heating means will supply heat to the heat exchanger. This heated liquid will in turn be pumped to the dissipating means from which heat will be released to the location to be heated. When the liquid being pumped rises above a preselected temperature the temperature sensitive means will switch the pump means to operate at its lower flow rate. This will result in the supply of energy to the heating means being cut off so that the temperature of the liquid will begin to fall. When the liquid temperature falls below a preselected value the pump means will again be switched to operate at its higher flow rate so that energy will again be supplied to the heating means thus repeating the system cycle.

It will therefore be seen that in a central heating system in accordance with the present invention the pump means is always operating even when the heating means is not supplying heat to the heat exchanger. This makes the present invention particularly suitable for use with the so called "low water content" central heating boilers in which the heat exchanger is made from copper and aluminum and in which serious damage, due to overheating, can be inflicted on the heat exchanger of the boiler if the flow of liquid through the heat exchanger is stopped, for instance due to pump failure, when the heating means is operating.

Also in a central heating system in accordance with the present invention the pump means, and thus the heating means, can be controlled by a temperature sensing means in the form of a simple thermostat which switches the pump means between its lower and higher flow rate conditions. This obviates the need for the use of a thermostatically controlled solenoid valve which has been required to control the operation of the heating means in previous central heating systems.

The lower flow rate is arranged to be sufficiently high to ensure that pockets of hot and cold liquid do not occur in the system and the temperature sensed by the thermostat is thus an accurate indication of the liquid temperature throughout the system.

Further advantages of the present invention are that when used with the above thermostat arrangement, the temperature setting at which the heating means is supplied with energy can be readily adjusted as compared with certain previous central heating systems in which the temperature sensing means has been incorporated as part of a valve to detect the flow rate of liquid around the system.

Also, since the thermostat and pump are separate components they can be positioned anywhere in the heating circuit. This is an important practical advantage since it may be desired, for example, to locate the heat exchanger and heating means in a bathroom and the pump means and thermostat at different locations due to electrical safety regulations.

The heating means of a central heating system in accordance with the present invention will normally be a gas or oil-fired burner. This burner will be supplied with fuel by a control means in the form of a gas or oil control valve. The heat dissipating means will normally comprise a number of radiators or convectors.

The flow rate sensing means may comprise a diaphragm mounted in a chamber so as to divide the chamber into two portions, one portion being connected to the throat of a venturi included in the central heating circuit and the other portion being connected to the entry section of the venturi, and an actuating member connected with the diaphragm and with the control means, the arrangement being such that when the liquid is being pumped through the venturi at the lower flow rate the pressure drop across the venturi is insufficient to cause the necessary deflection of the diaphragm to move the actuating means to operate the control means to supply energy to the heating means, but when the liquid is being pumped at the higher flow rate the pressure drop is sufficient to deflect the diaphragm and operate the control means to supply energy to the heating means.

In an alternative arrangement the flow rate sensing means may comprise a diaphragm as described above in which the portions of the chamber are connected to the inlet and outlet of the heat exchanger respectively in order to sense the flow rate in terms of the pressure drop across the heat exchanger.

In a still further alternative arrangement the diaphragm is arranged to sense the flow rate in terms of the pressure drop across an orifice plate in the circuit.

In a preferred arrangement the pumping means comprises a single pump which is arranged to pump the liquid at two flow rates only. However, the pumping means may comprise a pump which is arranged to pump the liquid at three or more flow rates. For example, if the pump is arranged to pump the liquid at three flow rates the pump will be arranged to operate at one of its upper two flow rates whenever the liquid temperature is below a pre-selected value, the pump operating at its highest flow rate when the liquid temperature is lower than the pre-selected value by more than a pre-selected amount.

Instead of using a pump operable at two or more speeds, the pump means may be also connected with a further liquid flow circuit which contains a flow diverter means, the diverter means being controlled by the temperature sensitive means so that when the temperature of the circulating fluid is below a pre-selected value the diverter means is arranged to ensure that all, or at least the greater part, of the liquid in the system is circulated around the main circuit by the pump means at said higher flow rate and when the temperature of the circulating fluid is above a pre-selected value said diverter means allows the pump means to circulate a sufficiently large proportion of the liquid in the system around said further flow circuit to cause the flow rate of liquid around said main circuit to fall to said lower value.

In a preferred arrangement the diverter means may be in the form of a solenoid operated valve provided in the further liquid flow circuit. This valve may be arranged to completely cut off the flow of liquid around the further liquid flow circuit at liquid temperatures below the previously referred to pre-selected value. For example, the temperature sensitive means may be arranged to close off the solenoid operated valve whenever the liquid temperature falls to 76° C. and to open this valve whenever the liquid temperature rises to 82° C.

The invention also provides a heating assembly for use in a central heating system in accordance with the first aspect of the invention, said assembly comprising a heat exchanger; a heating means arranged to supply heat to the heat exchanger; a control means arranged to control the supply of energy to the heating means; and flow sensing means arranged to operate the control means to prevent the supply of energy to the heating means in response to a liquid flow rate through the heat exchanger at said lower value and to operate the control means to supply energy to the heating means in response to a liquid flow rate at said higher value.

BRIEF DESCRIPTION OF DRAWINGS

One embodiment of the present invention will now be described by way of example with reference to the accompanying drawings in which.

DESCRIPTION OF PREFERRED EMBODIMENTS

Figure 1:
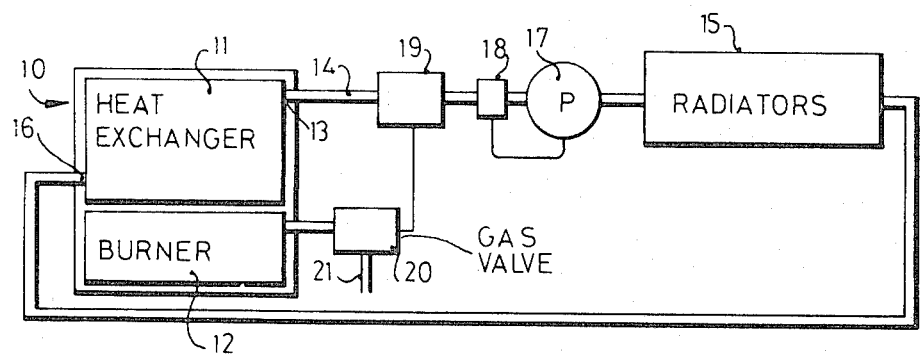
FIG. 1 is a diagrammatic representation of the central heating system embodying the present invention.

Referring to FIG. 1, the central heating system comprises a boiler 10 which includes a heat exchanger 11 and a gas fired burner 12. The heat exchanger has an outlet 13 which is connected by a piping circuit 14 with a number of radiators shown diagrammatically at 15.

The radiators are also connected with the heat exchanger inlet 16 to complete the piping circuit.

A pump 17 is included in the piping circuit. This pump is arranged to have two speeds, a lower speed at which the pump pumps the liquid through the circuit 14 from the heat exchanger 11 to the radiators 15 and back to the heat exchanger and a higher speed at which the pump pumps the liquid at a higher flow rate through the circuit 14.

The pump 17 is controlled by a thermostat 18 which comprises a temperature sensitive phial which senses the temperature of the liquid being pumped around the circuit and switches the pump between its higher and lower speeds depending on the sensed liquid temperature. Typically the thermostat 18 will be arranged to switch the pump to its lower flow rate whenever the temperature of the pumped liquid rises to 82 degrees centigrade and to its higher flow rate when the liquid temperature falls to 76 degrees centigrade.

Figure 2:
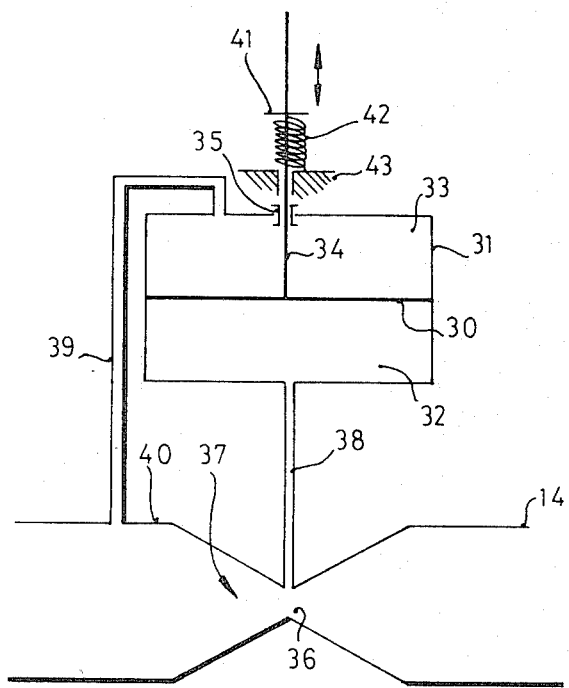
FIG. 2 is a diagrammatic representation of the flow sensing means used in the system of FIG. 1.

The piping circuit 14 also includes a flow rate sensing means 19 which is shown in greater detail in FIG. 2. The flow rate sensing means is connected with a gas valve 20 which controls the supply of gas from an inlet pipe 21 to the burner 12. The flow rate sensing means is set up so that when the sensing means detects that the pump 17 is operating at its lower speed the gas valve 20 is arranged to be closed so that no gas is supplied to the burner 12 to apply heat to the heat exchanger 11. When the flow rate sensing means 19 senses that the pump 17 is operating at its higher speed the gas valve 20 is arranged to be opened to supply gas to the burner 12 to heat the heat exchanger 11.

Referring to FIG. 2, the flow rate sensing means comprises a diaphragm 30 secured within a chamber 31 so as to divide the chamber into two portions 32 and 33. The portion 32 of the chamber is connected via a pressure tapping 38 with the throat 36 of a venturi 37 which forms part of the piping circuit 14. The other portion 33 of the chamber 31 is connected by a pressure tapping 39 with the entry section 40 of the venturi.

An actuating member in the form of a rod 34 is connected with the diaphragm 30 and projects from the chamber 31 via a sealing gland 35. The rod 34 is connected by a suitable linkage with the gas valve 20 to move the gas valve between its open and closed positions.

An abutment 41 is provided on the rod 34 and a spring 42 acts between this abutment and a further fixed abutment 43 to bias the diaphragm to the position shown in FIG. 2.

The flow sensing means is arranged so that when the liquid is being pumped through the venturi 37 at the lower flow rate the pressure drop between the tappings 39 and 38 is insufficient to cause the diaphragm to be displaced downwardly, considering the diaphragm as shown in FIG. 2, against the action of the spring 42. With the diaphragm in the position shown in FIG. 2 the gas valve is arranged to be in its closed position so that the burner 12 does not apply any heat to the exchanger 11.

When the pump is operating at its higher flow rate the pressure in the tapping 38 is sufficiently below that in the tapping 39 to draw the diaphragm 30 down against the action of the spring 42 thus displacing the rod 34 and opening the gas valve 20 so that the burner 12 can apply heat to the heat exchanger 11.

The cycle of operation of the system described above in relation to FIGS. 1 and 2 is as follows. When the system is first switched on and the liquid in the heat exchanger and piping circuit 14 is cold the thermostat 18 will cause the pump 17 to pump the liquid around the circuit 14 and through the heat exchanger 11 at the higher flow rate. This will in turn cause the flow rate sensing means 19 to open the gas valve 20 which will enable the burner 12 to apply heat to the heat exchanger 11. The temperature of the liquid being pumped around the circuit 14 will thus progressively rise until the preselected value of say 82 degrees centigrade is reached, when the thermostat 18 will switch the pump to its lower speed. This fall in the flow rate of liquid around the circuit 14 will be sensed by the flow rate sensing means 19 which will therefore close the gas valve 20 and thus cut off the supply of heat to the heat exchanger 11.

When the thermostat 18 senses that the temperature of the pumped liquid has fallen below 76 degrees centigrade the thermostat will again switch the pump to its higher flow rate thus causing the above system cycle to be repeated.

It will be seen from the above that whenever the central heating system is operating the pump 17 is always pumping liquid around the heating circuit whether or not the burner 12 is applying heat to the heat exchanger 11.

Figure 3:
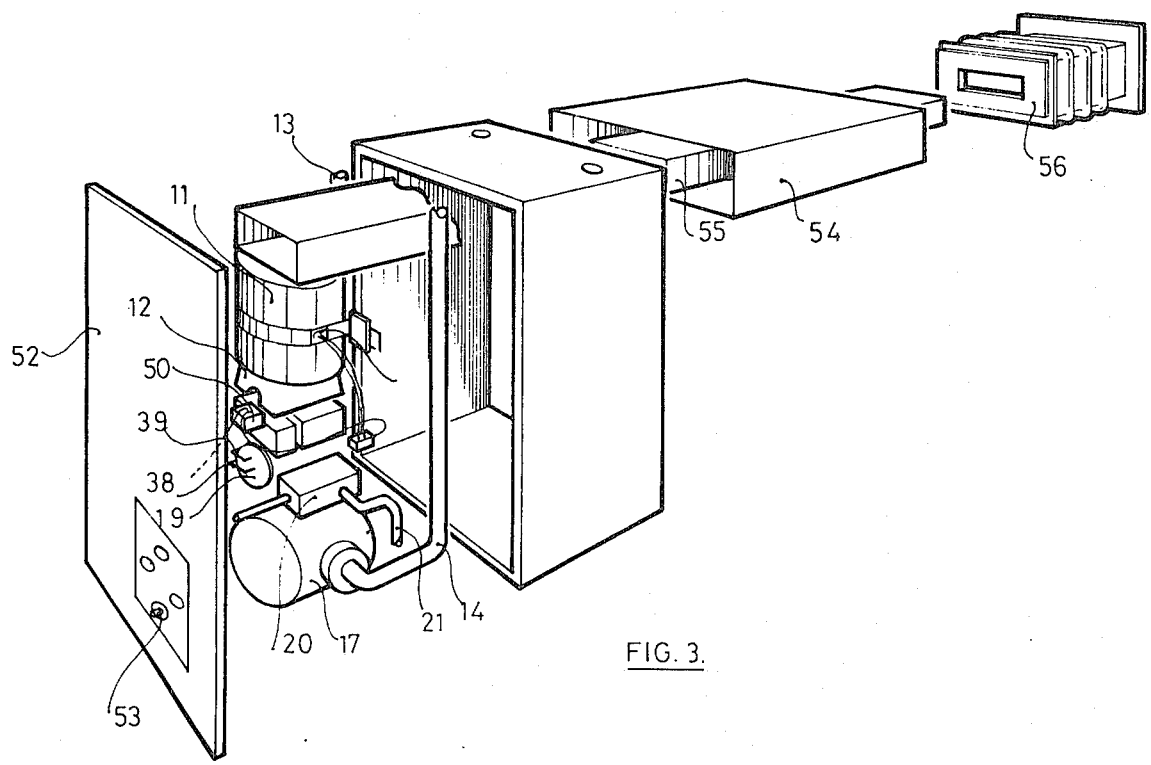
FIG. 3 is an exploded perspective view of part of the system shown diagrammatically in FIG. 1.

FIG. 3 shows part of the system described above with reference to FIGS. 1 and 2 and those components shown in FIG. 3 which have been previously described with reference to FIGS. 1 and 2 have therefore been similarly numbered.

The installation shown in FIG. 3 includes the normal pilot burner 50 which, in a conventional manner, burns continuously and is not controlled by the gas valve 20. Also included in the installation is a flame failure device (not shown) which in the conventional manner will cut off the entire gas supply in the event of the failure of the pilot light. An overheat thermostat 51 is provided which protects the heat exchanger 11 against damage due to overheating and is arranged to shut-off the gas supply to the burner by interrupting a thermocouple circuit in the conventional pilot flame failure device. The heat exchanger 11 is connected to an outlet pipe 13 leading to the reaiators of the system the return pipe of the piping system 14 being connected to the pump 17.

The thermostat 18 is mounted on the back of a front panel 52 of the installation and can be adjusted to a desired value by a dial 53.

The burner 12 is supplied with air through a duct 54 which forms a balanced flue arrangement with an exhaust flue 55. The balanced flue terminates in a terminal 56 which will project through the outside wall of the building in which the installation is fitted in the conventional manner. Other forms of flue can be used if desired.

Figure 4:
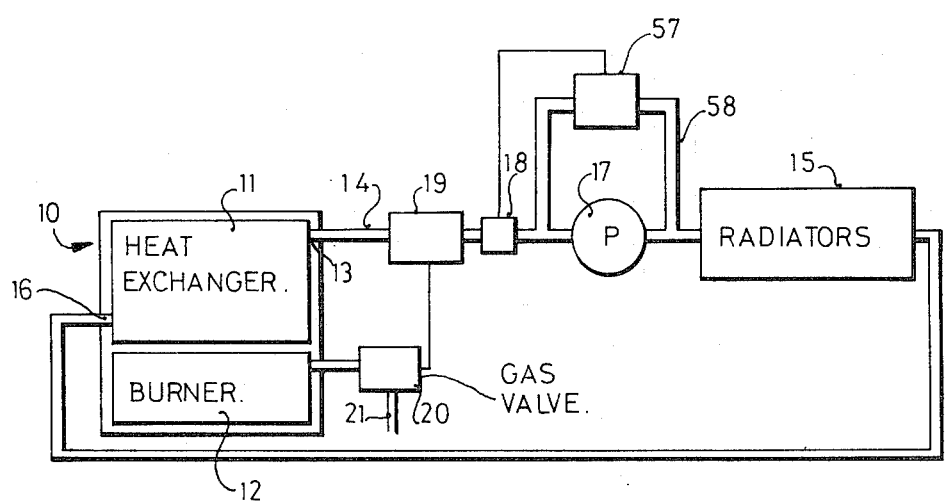
FIG. 4 is a diagrammatic representation of a modified form of central heating system embodying the invention.

Referring now to FIG. 4 of the accompanying drawings, the central heating system is as described with reference to FIG. 1 with the addition of a further liquid flow circuit 58 which is connected across the pump 17 and the omission of the connection between the thermostat 18 and the pump 17.

The further flow circuit 58 includes a flow diverter means in the form of a solenoid operated valve 57 which is connected with the thermostat 18.

The thermostat 18 is arranged to control the valve 57 so that the valve is closed when the system is heating up from cold. This causes the pump 17, which operates at a single speed, to pump the liquid around the main circuit 14 at a first and higher flow rate.

This in turn causes the flow rate sensing means 19 to open the gas valve 20 which enables the burner 12 to apply heat to the heat exchanger 11. The temperature of the liquid being pumped around the main circuit 14 thus progressively rises until a preselected value of say 82° C. is reached when the thermostat 18 is arranged to open the valve 57 thus effectively short circuiting the main liquid circuit 14 and causing the pump 17 to pump a sufficient quantity of liquid around the circuit 58 to cause the flow rate of liquid around the main circuit 14 to fall to a second and lower value which is insufficient to cause the flow rate sensing means 19 to operate the gas valve 20 so that heat is no longer supplied to the heat exchanger 11. The temperature of the liquid circulating around the circuit 14 will thus fall and when a temperature of say 76° C. is reached the thermostat 18 is again arranged to close the valve 57 thus causing the flow rate of liquid around the main circuit 14 to again rise to its higher value which results in the system cycle again being repeated.

It will be seen from the above that it is therefore possible by using a single speed pump 17 to cause the flow rate of liquid around the main circuit 14 to be selectively switched between the higher and lower values in the manner previously accomplished using a two speed pump.

We claim

1. A central heating system comprising a heat exchanger; a heat dissipating means for releasing heat to a location to be heated; a piping circuit connecting the heat exchanger and dissipating means for flow of liquid from the heat exchanger to the dissipating means and return to the heat exchanger; pump means for pumping liquid around the piping circuit at a selected one of a higher and a lower flow rate; heating means for supplying heat to the heat exchanger; control means for controlling supply of energy to the heating means, flow rate sensing means for sensing the flow rate of liquid in the piping circuit, means connecting the flow rate sensing means and the control means for operating the latter to supply energy to the heating means whenever the pump is operating at said higher rate and to cut off the supply of energy whenever the pump means is operating at said lower rate; and temperature sensing means for operating the pump means at its lower flow rate whenever the temperature of the circulating liquid is above a preselected value and at its higher flow rate when ever said temperature is below a preselected value.

2. A heating system according to claim 1 wherein the flow rate sensing means comprises a venturi included in the piping circuit, a chamber having a diaphagrm mounted therein so as to divide the chamber into two portions, means connecting one portion of the chamber to the throat of the venturi and the other portion of the chamber to the entry section of the venturi, and an actuating member establishing a connection between the diaphragm and the control means, whereby when the liquid is being pumped through the venturi at the lower flow rate the pressure drop across the venturi is insufficient to cause the necessary deflection of the diaphragm to move the actuating means to operate the control means to supply energy to the heating means, but when the liquid is being pumped at the higher flow rate the pressure drop is sufficient to deflect the diaphragm and operate the control means to supply energy to the heating means.

3. A heating system according to claim 1 wherein the pump means comprises a single pump arranged to pump the liquid at two flow rates only.

4. A heating system according to claim 1 wherein the pump means comprises a pump arranged to pump the liquid at least three flow rates, and is arranged to operate at one of its upper flow rates whenever the liquid temperature is below a preselected value and at its highest flow rate when the liquid temperature is lower than the preselected value by more than a preselected amount.

5. A heating system according claim 1 further comprising a further liquid flow circuit connected to the pump means, and a flow diverter means, contained in said further circuit, the flow diverter means being controlled by the temperature sensitive means so that when the temperature of the circulated fluid is below a preselected value the diverter means is arranged to ensure that at least the greater part of the liquid in the system is circulated around the main circuit by the pump means at said higher flow rate, and when the temperature of the circulating fluid is above a preselected value said diverter means allows the pump to circulate a sufficiently large proportion of the liquid in the system around said further flow circuit to cause the flow rate of liquid around said main circuit to fall to said lower value.

6. A heating system according to claim 5 wherein the diverter means comprises a solenoid operated valve, provided in the further liquid flow circuit.

7. A heating system according to claim 6 wherein said solenoid operated valve is arranged to completely cut off the flow of liquid around the further liquid flow circuit at liquid temperature below said preselected value.

* * * * *